Oct. 1, 1940.  V. H. SEVERY  2,216,480
RING LEVER LATCH AND INDICATOR
Filed Sept. 16, 1937
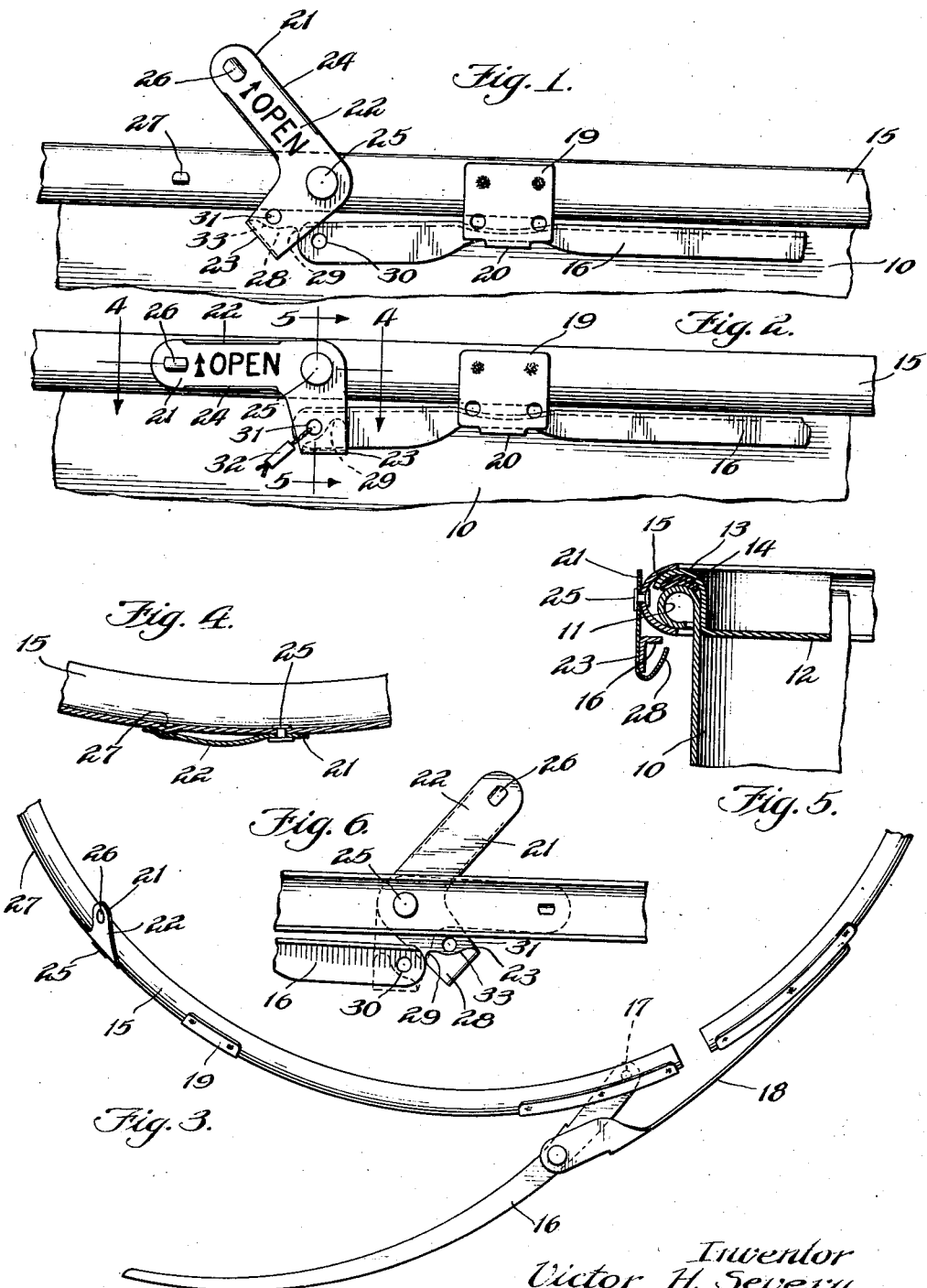
Inventor
Victor H. Severy
By Glenn S. Noble
Atty.

Patented Oct. 1, 1940

2,216,480

UNITED STATES PATENT OFFICE 2,216,480

RING LEVER LATCH AND INDICATOR

Victor H. Severy, Chicago, Ill., assignor to Wilson & Bennett Manufacturing Company, Chicago, Ill., a corporation of Illinois Application September 16, 1937, Serial No. 164,207

3 Claims. (Cl. 220—61)

The use of sealing rings or locking rings for fastening covers to containers such as barrels, pails, or the like, has become well known and quite general. Some of such rings are split and provided with levers or links and levers for closing and locking or fastening the same in closed position. Heretofore it has been common to provide hooks or projections for engagement by the free ends of the levers for holding them in fastening position. It has also been proposed to use wire seals or the like for securing the levers to the hooks or projections but such seals have not been used to any considerable extent. As a consequence it has been found that in the handling of the containers as in shipping or stacking, the levers are apt to be disconnected from the hooks which will permit the tops to become loosened with a consequent loss or damage to the contents of the containers.

The principal object of the present invention is to provide a catch or fastener for fastening closing levers of the kind indicated in closed position, such catch or fastener having associated therewith or provided with means for readily indicating whether or not it is in fastening position.

Other objects are to provide a ring lever latch and indicator which will be of simple construction whereby it may be made at a low cost and which may be readily applied to the locking ring; to provide a catch having a lever or handle portion which is preferably painted red or other suitable distinguishing color so that it will readily indicate the position thereof; to provide a container having a closing ring with a locking lever and means for latching the lever in closed position, said means having an indicator and arranged so that the indicator will be in raised or danger position when the locking lever is released from locking position; and to provide such other improvements and novel features as will be described more fully hereinafter.

In the accompanying drawing,

Figure 1 is a side view of a portion of a container with the closing lever shown in closed position and the latch in raised or non-closing position;

Figure 2 is a similar view showing the latch in fastening position with the seal applied thereto;

Figure 3 is a plan view showing the ring in partially opened position;

Figure 4 is a sectional detail taken on the line 4—4 of Figure 2;

Figure 5 is a cross section taken on the line 5—5 of Figure 2; and

Figure 6 is a view similar to Figure 1 taken from the inside of the ring.

The container 10 which may be of any size, as for instance a pail, barrel, drum, or the like, is of the type having an open end with a peripheral bead 11 and a cover 12 having a flange 13 that extends over the bead in the usual manner. A gasket 14 may also be provided for making a tight closure. The closing ring 15 is split as shown, to permit its being applied to the bead and flange as indicated in Figure 5, and has a closing lever 16 which is pivotally connected at 17 to one end of the ring and is connected to the other end of the ring by means of a link or flexible bar as shown at 18. It will be understood that numerous lever operated closing arrangements have heretofore been patented or used and my improved catch is intended to be used with any of such lever operated devices to which it may be applied. The lever 16 is held in closed position by a hook or catch 19 which is secured to the ring in any suitable manner and which preferably has an inwardly turned flange or projection 20 in engagement with the lower surface of the lever to hold it in fastening position. It will be noted that the space between the inner edge of the projection 20 and the adjacent wall of the container 10 is preferably about the same as the width of the lever at the engaging point so that the lever has to be brought substantially in contact with the wall of the container before it can be slipped under the projection.

In order to hold the lever in such engaging position I provide a latch designated generally by the numeral 21. This latch and indicating member is preferably made of resilient material such as spring steel or the like and is in the form of a bell-crank lever having a long arm 22 and a short arm 23. The long arm comprises the handle and indicating portion and is preferably provided with longitudinal flanges or thumb-pieces 24 for convenience in operating the same. The latch is pivotally connected to the ring 10 by a pivot 25 and the handle portion 22 is bent or biased so that its free end tends to engage closely with the outer surface of the ring when in latching position. The outer end is provided with a recess 26 which engages with a tit or projection 27 on the ring for holding the latch in fastening position. The shorter lever portion or arm 23 extends downwardly to the lower edge of the lever 16, which end is shown as being L-shaped in cross section as indicated in Figure 5, and is then bent upwardly and inwardly to embrace the end of the lever. The upwardly and inwardly extending end 28 is curved or terminates as shown at 29 so that when the latch is in full open position the end of the lever 16 will just about clear the same when the lever is pressed inwardly or toward the container to release it from the projection 20. In other words the latch is so constructed and positioned that the lever cannot be released until the latch is in fully releasing position with the arm 24 extending upwardly to indicating position as shown in Figure 1. The end of the lever 16 and the hook portion of the latch are provided respectively with holes 30 and 31 for receiving a wire seal 32, the inwardly projecting end 28 of the hook portion being cut away as shown at 33 in Figure 6 to permit the ready application of the seal and also to permit the lever to swing to the desired indicating position, such inwardly projecting or hook portion serving as a stop to limit the opening movement of the latch and to define the position of the indicating lever 22 when in inoperative position.

When the containers are shipped from the factory, they are usually shipped with the covers closed and the catches are swung down to catching or fastening position as shown in Figure 2. When the user receives the barrels, the latches are swung to releasing or open position as shown in Figure 1, which permits the levers to be released from the catches 19 and the tops removed in the usual manner. After the container has been filled the cover is again applied, the lever 16 moved to closing position with its end brought under the catch 19. The latch 21 is then swung to fastening position which will insure the holding of the lever in closing position during shipment or the like. However, if the operator fails to close the latch, such failure will be obvious and readily noticed by the upwardly extending indicator or lever 22, which as above suggested is preferably painted red so that it will be readily visible and serve as a warning that it has not been properly closed.

While I have shown a preferred form of my invention as applicable to a particular type of closing ring, it is apparent that it may be modified for use with other types or styles of rings and therefore I do not wish to be limited to the particular form shown and described except as specified in the following claims, in which I claim.

1. The combination with a cover closing ring for containers, having a closing lever adapted to lie along the ring when in closed position, of a bell-crank lever pivoted to the ring adjacent to the end of the closing lever and having one arm provided with a hook which engages with the end of the lever to hold it in fastening position, and another arm for swinging the same and for indicating the position of the bell-crank lever, and means coacting with the ring for engagement with the last-named arm to hold the bell-crank lever in fastening position, said latch having a readily observable projection to show whether it is in fastening or unfastening position and said latch being interlocked with the lever whereby the lever cannot be moved to fastening position except when the latch is in unfastening position.

2. The combination with a container having a cover and a closing ring provided with a closing lever for fastening the cover in position, of a latch pivoted to the ring adjacent to the end of the lever when in closed position, the latch having one arm extending downwardly and provided with a hook portion which engages with the end of the lever to hold it in closed position, and engages with the ring for limiting the movement of the latch, said latch having an operating arm which extends upwardly when the latch is in released position, and lies along the ring when in engaging position, and means for holding the latch in engaging position, said latch having a readily observable projection to show whether it is in fastening or unfastening position and said latch being interlocked with the lever whereby the lever cannot be moved to fastening position except when the latch is in unfastening position.

3. The combination of a container having an outwardly projecting bead, a cover engaging with said bead, a split closing ring for holding the cover in position, a lever having one end pivotally connected with the ring adjacent to one end thereof, a connection between the lever and the opposite end of the ring for drawing the ends together, said lever being curved to conform to the shape of the ring, a catch secured to the ring and having an inwardly extending projection, the space between the projection and the adjacent wall of the container being substantially the same as the width of the lever at such point, a latch formed of resilient material pivoted to the ring adjacent to the end of the lever and having one arm extending downwardly to form a re-entrant hook-like portion which engages with the end of the lever when in latching position and with the adjacent portion of the ring when in open position, the arrangement being such that the latch must be substantially fully opened before the closing lever can be disengaged from the catch, the latch also having another arm which extends upwardly when in releasing position and lies along the ring when in fastening position, and a projection on the ring engaging with a recess in the last-named arm for holding the latch in fastening position, said latch having a readily observable projection to show whether it is in fastening or unfastening position and said latch being interlocked with the lever whereby the lever cannot be moved to fastening position except when the latch is in unfastening position.

VICTOR H. SEVERY.